2,984,634

CRYSTALLINE POLYMERIZED MONOOLEFINIC HYDROCARBONS CONTAINING METAL SALT OF CARBOXYLIC ACID

John R. Caldwell and Russell Gilkey, Kingsport, Tenn., assignors to Eastman Kodak Company, Rochester, N.Y., a corporation of New Jersey No Drawing. Filed Jan. 30, 1957, Ser. No. 637,082

6 Claims. (Cl. 260—23)

This invention relates to a process for the production of crystallizable polymeric hydrocarbons having an improved affinity for dyes, printing inks, and sizing agents, and the like, and to the polymeric compositions thus produced.

It is well known in the art that crystallizable polymeric hydrocarbons are extremely hydrophobic and resistant to penetration by aqueous solutions or aqueous suspensions. Furthermore, polar groups, such as amide, hydroxyl, ester and carboxyl groups are not present in the polymeric hydrocarbons, except as trace impurities. For these reasons, it is quite difficult to color or dye the polymeric hydrocarbons with any of the dyes normally employed for coloring filaments or fabrics. In some cases, light shades or tints of the polymeric hydrocarbons can be obtained with cellulose acetate dyes, but the fastness to washing is poor because there are no polar groups to serve as points of attachment or anchor sites for the dyes.

The prior art in U.S. Patent 2,668,134 has described a process in which a polyethylene film is immersed in a saturated solution of sodium dichromate in sulfuric acid and the treated film can be dyed with basic dyes or printed readily. The process described in this patent is purely an oxidation reaction that produces carboxyl groups on the surface of the polymer. The chromium from the sodium dichromate is not introduced into the polymer and the oxidized polymer cannot be dyed with mordant or chelate dyes.

In accordance with this invention, it has been found that the properties of crystallizable polymeric hydrocarbons can be improved by the incorporation into the polymer of a polyvalent metal. The presence of the metal in the polymeric hydrocarbon improves the dyeing properties of the polymer. The polyvalent metal also improves the adherence of printing inks, sizing agents and other coating agents to the polymer.

The polyvalent metals that are incorporated in the polymeric hydrocarbon in accordance with this invention are nickel, chromium, cobalt, aluminum, titanium and zirconium. If desired, the mixed rare earth metals can also be used. For example, the mixture of cerium, lanthanum and praseodymium found occurring together in certain ores can be employed in the practice of this invention. The metal can be incorporated in the polymeric hydrocarbons in the form of the metal itself or in the form of the oxides, hydroxides or salts of the metal depending upon the specific material used and the method of application. Carboxylic acid salts of the above metals containing from 6 to 12 carbon atoms are particularly useful because they tend to be compatible with the polymeric hydrocarbons and the salts can be readily dispersed or dissolved by ordinary mixing or milling procedures. Other salts that can be used are the sulfates and the oleates of said polyvalent metals.

The practice of this invention is directed primarily to the improvement of the physical properties of crystallizable polymeric hydrocarbons. Among the hydrocarbons that can be used to form these polymers are styrene, ethylene, propylene, butylene, methylpentene and other related mono-olefinic hydrocarbons. The crystalline polymers can be prepared from the mono-olefinic hydrocarbons by various procedures, for example, polymerization of an α-mono-olefinic hydrocarbon with a metal-containing catalyst such as aluminum alkyls, molybdenum, chromium or vanadium oxides or similar metal-containing catalyst with or without an activator such as a titanium compound, sodium compound and the like. The polymeric hydrocarbons can be in the form of a fiber or other extruded or shaped object. The fibers of the polymeric hydrocarbons can be advantageously formed by any of the melt spinning techniques.

In one embodiment of the invention, the polyvalent metal is incorporated in the polymeric hydrocarbon by applying the polyvalent metal or compound of the metal, such as a carboxylic acid salt of the metal, to the surface of the film or fiber from a solution or suspension in water or in an organic solvent. When this procedure is employed, the metal or metal compound is largely confined to the surface of the fiber, film or other shaped object of the polymeric hydrocarbon. Particularly valuable results can be obtained with chromium trioxide in this procedure. The chromium trioxide is dissolved in a mixture of tert-butyl alcohol and carbon tetrachloride containing, for example, equal parts by weight of both components of the mixture. The solution is then diluted with additional carbon tetrachloride to produce a concentration of 0.1 to 5% by weight of chromium trioxide. This solution is applied to fabrics, films, sheets or other shaped objects of the polymeric hydrocarbon by dipping, spraying or other suitable procedures. The treated polymeric hydrocarbon is then heated to a temperature of 90 to 140° C. for about 1 to 5 minutes. The chromium trioxide reacts chemically with the polymeric hydrocarbon to produce trivalent chromium compounds that are permanently attached to the surface of the polymeric hydrocarbon and cannot be removed by washing. Polymeric hydrocarbon products treated in this manner can be readily dyed to deep shades with mordant dyes. The products also show improved adhesion for printing inks, sizing agents laminating agents and the like.

In another embodiment of this invention, the polyvalent metal or metal compound can be incorporated into the crystallizable polymeric hydrocarbon prior to the spinning, extruding or otherwise shaping of the polymeric hydrocarbon. In this embodiment of the invention, the metal or metal compound is dispersed uniformly throughout the cross-section of the film, filament or other shaped object of the polymeric hydrocarbon. Several methods can be employed to obtain an intimate dispersion or solution of the metal or metal compound in the polymeric hydrocarbon. One method of obtaining such an intimate dispersion involves slurrying powdered polymeric hydrocarbon in a liquid dispersion or solution of the polyvalent metal or compound of the polyvalent metal. The slurry is then evaporated to dryness leaving the metal or metal compound attached to or coating the particles of the polymeric hydrocarbon. The resulting powder is then extruded into fibers or films which consist of a uniform dispersion or solution of the metal or metal compound in the crystallizable hydrocarbon polymer. Carboxylic acid salts of the polyvalent metals containing 6 to 12 carbon atoms are compatible with the polymeric hydrocarbon and consequently lead to a solution of the polyvalent metal compound in the polymeric hydrocarbon. The preferred amount of metal or metal compound that is used is sufficient to produce a polymeric hydrocarbon containing 0.1 to 2% by weight of the metal. The fiber or film produced in this manner can be drafted or crystallized, then dyed or printed readily by any of the known printing and dyeing techniques.

Another procedure for incorporating the metal or metal compound in the polymeric hydrocarbon involves milling the metal compound with the polymeric hydrocarbon on heated rolls. The polyvalent metal or metal compound is added as a solution or dispersion or in a powdered form to the polymeric hydrocarbon as it is being milled on the heated rolls and while the polymeric hydrocarbon is in a molten condition. The polymer dispersion or solution can then be extruded into fibers or films which can be readily dyed by any of the well known procedures.

Another method for incorporating the polyvalent metal into the polymeric hydrocarbon involves dissolving or suspending the polyvalent metal or compound of the polyvalent metal in a solution of the polymeric hydrocarbon. The polyvalent metal or metal compound is suspended in an organic liquid which is a non-solvent for the polymeric hydrocarbon at low temperatures but which readily dissolves the polymeric hydrocarbon when heated. The polymer is dissolved in the hot suspension containing the polyvalent metal or metal compound and the mixture is then allowed to cool. The polymer crystallizes out of the solvent carrying with it the polyvalent metal or metal compound as a fine dispersion in the polymeric hydrocarbon. The polymer is then filtered and dried and the dried polymer can be extruded into fibers or films which can be drafted, crystallized and dyed or printed by any of the known procedures.

In general, any fiber, film or other shaped object made from crystallizable hydrocarbon polymers can be modified by the process of this invention to impart improved properties to the polymer. Suitable types of crystallizable hydrocarbon polymers are described by Natta in Makromolecular Chemie 16, 213–237 (1955), and Angew. Chem. 68, 393 (1956). Crystallizable vinyl ether polymers can also be improved in accordance with this invention.

Suitable dyes that can be employed in dyeing any of the hydrocarbon polymers described herein include those set forth in the annual edition of the "Technical Manual and Yearbook of the American Association of Textile Chemists and Colorists," for example, the 1952 edition.

Among the dyes that can be used to color the crystallizable polymeric hydrocarbons within the scope of this invention are those dyes known to chelate or mordant with the metals or metal compounds that are incorporated into the hydrocarbon polymers. Among the dyes that can be used are those described in U.S. Patents 2,641,602 and 2,651,641. These dyes have the structural formulas:

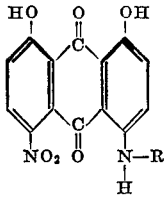

wherein R is a phenylethyl alcohol nucleus, and

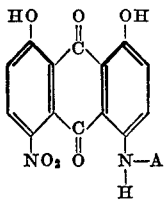

wherein A is a monocyclic benzene nucleus containing a

group wherein R represents hydrogen, methyl or ethyl.

The above dyes are merely representative of dyes that can be used. Other suitable dyes are described in the following copending applications:

Straley and Fisher, Serial No. 458,262, filed September 24, 1954
Straley and Giles, Serial No. 466,955, filed November 4, 1954
Straley and Wallace, Serial No. 498,112, filed March 30, 1955
Straley and Wallace, Serial No. 575,953, filed April 4, 1956

The metals or metal compounds that are incorporated into crystallizable polymeric hydrocarbons in accordance with this invention can be supported on a finely-divided pigment. The metals and metal compounds can be used alone in practicing the invention, but good results can also be obtained when the metals or metal compounds are deposited on a fine pigment that has an active surface or a porous structure prior to addition and incorporation in the polymeric hydrocarbon. The pigment tends to increase the exposed area of the metal or metal compound and, in general the pigment should have a particle size less than about 3 microns and preferably less than about 0.5 micron. Suitable pigments that can be used are silica gel, activated alumina, ultra-fine calcium carbonate, magnesium carbonate, magnesium oxide, calcium silicate and magnesium silicate.

*Example 1*

A solution of t-butyl chromate was prepared by dissolving 0.5 g. of chromic acid (chromium trioxide) in a mixture of 50 ml. of t-butyl alcohol and 50 ml. of carbon tetrachloride, and then diluting with 100 ml. of carbon tetrachloride. The solution contained 0.25% chromium trioxide on a weight per volume basis. This solution was sprayed on a fabric made from crystallizable polypyropylene yarn. The treated fabric was heated at 140° C. for one minute. A light, grayish-brown color was produced indicating that the chromium had been reduced to the trivalent state. This fabric dyed well with chrome mordant dyes and the dyes were fast to washing and light. The mordant dyes suitable for use with the metal compounds in this and subsequent examples are well known in the textile art and are represented by Omega Chrome Aurine GL (C.I. No. 201), Omega Chrome Brown (C.I. No. 98), Omega Chrome Red B (C.I. No. 652), and Alizarin Red S (C.I. No. 1034).

*Example 2*

A film containing crystallizable polyvinylisobutyl ether was sprayed with the chromium trioxide solution described in Example 1. The treated film was heated at 70° C. for 5 minutes. The chromium is chemically bound to the surface of the film and cannot be removed by physical treatments such as flexing, scouring, etc. The film dyed well with chrome mordant dyes.

*Example 3*

Polyethylene film was painted with the chromium trioxide solution described in Example 1. It was then heated at 90° C. for 3 minutes. The treated film had trivalent chromium combined on the surface of the film and could be dyed with chrome mordant dyes. The surface of the film also exhibited improved adhesion to printing inks.

*Example 4*

Crystalline polyethylene with a particle size of less than 0.003 inch was prepared as described in Angew. Chem. 67, 541–547 (1955). Two hundred grams of the powder were slurried in a solution of 8 g. of chromium trioxide in 100 ml. of t-butyl alcohol and 200 ml. of carbon tetrachloride. The solvents were then evaporated under vacuum at 80° C. The dry powder contained an equivalent of 2% chromium based on the polyethylene. Fibers and films obtained from the treated polymer by melt extrusion were light green in color and dyed well with chrome mordant dyes.

Example 5

Crystalline polypropylene with a particle size of less than 0.006 inch was prepared as described in Makromolecular Chemie 16, 213 (1955). The powder was slurried in an isopropyl alcohol solution of the mixed nickel salt of 2-ethyl hexanoic acid and pelargonic acid so that the dry product contained 0.2% nickel. The isopropyl alcohol was evaporated and the dry powder was melt extruded into fibers. The nickel salt was compatible with the polypropylene and the fibers were clear and tinted green. The fibers dyed to deep shades with nickel chelate dyes and the colors were light and wash fast. Suitable examples of dyes that can be used include those described in U.S. Patents 2,641,602 and 2,651,641.

Example 6

A crystalline poly-4-methyl-pentene-1 was prepared according to the procedure described in the reference given in Example 5. It was slurried in a solution of titanium tetrabutoxide in butyl alcohol so that the product contained 1% titanium, probably as a finely-divided, hydrated titanium dioxide. The alcohol was evaporated and the poly-4-methyl-pentene-1, containing the titanium compound deposited on the polymer particles, was melt extruded into fibers and films. They dyed readily with mordant dyes.

Example 7

A finely-divided aluminum hydroxide was prepared by adding water to aluminum butoxide. It was incorporated into crystallizable polystyrene by a process similar to that in Example 6. After drying, the polystyrene was melt extruded into films and fibers. The aluminum oxide was intimately dispersed in the polymer. The amount of aluminum present was 1.5% based on the polymer. The films and fibers dyed well with mordant dyes.

Example 8

Zirconium laurate was milled into crystallizable polyethylene on heated rolls until a homogenous solution was obtained. The mixture, containing one percent zirconium, was melt extruded to give films and fibers. The fibers dyed well with mordant and acid wool dyes. Printing inks adhered well to the surface of the films.

Example 9

Cobalt oleate was milled into crystallizable polybutylene as in Example 8. The cobalt salt was compatible with the polybutylene and the product, containing 0.2% cobalt, was light lavender in color. Fibers obtained by melt extrusion dyed to deep shades with dyes that chelate with cobalt.

Example 10

Anhydrous nickel sulfate was pulverized to a particle size of less than 0.001 inch. It was milled into crystallizable polypropylene until completely dispersed. The product was melt extruded into fibers which contained 0.3% nickel. The fibers dyed well with dyes that chelate with nickel.

Example 11

A 1:1 mixture of chromium sulfate deposited on silica was pulverized to a particle size of less than 0.001 inch. This powder was dispersed in a hot solution of crystallizable polyethylene in xylene. The mixture was allowed to cool and as the polyethylene separated from solution it carried the inorganic pigment down with it. The polymer was isolated and dried. The product was melt spun to give fibers which dyed well with chrome mordant dyes. The amounts of pigment and polymer were adjusted to give a product containing 2% chromium. The inorganic pigments in Examples 10 and 11 are not affected by the relatively high extrusion temperatures necessary to spin these polymers.

Example 12

A colloidal suspension of nickel was used in place of the chromium sulfate silica mixture in Example 11. Fibers were spun containing 0.4% of the well dispersed nickel. They dyed readily with nickel chelate dyes.

We claim:

1. As a composition of matter, a shaped crystalline polymerized α-monoolefinic hydrocarbon of improved dyeing properties containing a metal compound selected from the group consisting of the 6 to 12 carbon atom carboxylic acid salts of nickel, chromium, cobalt, aluminum, titanium and zirconium and wherein said polymerized hydrocarbon contains 0.1 to 2% by weight of said metal compound calculated as metal.

2. A composition according to claim 1 wherein the polymeric hydrocarbon is polyethylene.

3. A composition according to claim 1 wherein the polymeric hydrocarbon is polypropylene.

4. A composition according to claim 1 wherein the polymeric hydrocarbon is poly-4-methyl-pentene-1.

5. A composition according to claim 1 wherein the polymeric hydrocarbon is polystyrene.

6. A composition according to claim 1 wherein the polymeric hydrocarbon is polybutylene.

References Cited in the file of this patent

UNITED STATES PATENTS

| | | |
|---|---|---|
| 2,570,856 | Pratt et al. | Oct. 9, 1951 |
| 2,691,647 | Field et al. | Oct. 12, 1954 |
| 2,718,473 | Powers | Sept. 20, 1955 |
| 2,727,023 | Evering et al. | Dec. 13, 1955 |
| 2,874,140 | Kloepfer | Feb. 17, 1959 |